United States Patent

[11] 3,542,467

| [72] | Inventors | Lawrence A. Ferguson<br>West Webster,<br>Robert K. Jones, Palmyra; Donald W. Tates, Fairport, New York |
|---|---|---|
| [21] | Appl. No. | 721,321 |
| [22] | Filed | April 15, 1968 |
| [45] | Patented | Nov. 24, 1970 |
| [73] | Assignee | Xerox Corporation<br>Rochester, New York<br>a corporation of New York |

[54] XEROGRAPHIC REPRODUCING APPARATUS
5 Claims, 11 Drawing Figs.

[52] U.S. Cl. .................................................. 355/8, 355/60
[51] Int. Cl. ............................................. G03b 23/34, G03b 27/42
[50] Field of Search .......................................... 355/3, 57, 60, 8

[56] References Cited
UNITED STATES PATENTS

| 2,411,694 | 11/1946 | Place ........................... | 355/60 |
| 3,286,587 | 11/1966 | Hayden et al. ................. | 355/57 |
| 3,301,126 | 1/1967 | Osborne et al. ............... | 355/14 |
| 3,408,141 | 10/1968 | Grant ........................... | 355/60 |

Primary Examiner—John M. Horan
Assistant Examiner—D. J. Clement
Attorneys—Norman E. Schrader, James J. Ralabate and Ronald Zibelli

ABSTRACT: Automatic xerographic apparatus for reproducing documents at one of a plurality of optical reduction rates. The apparatus includes an image mirror, lens and object mirror to project an image of a stationary original onto a moving xerographic surface. The image mirror and lens are selectively shiftable to vary the conjugate length of the optical system to thereby produce the desired optical reduction. The object mirror is oscillatory at one of several scan rates correlated to the conjugate length to produce undistorted reproductions of the original documents at the preselected reduction rate.

Patented Nov. 24, 1970

INVENTORS
LAWRENCE A. FERGUSON
ROBERT K. JONES
DONALD W. TATES
BY
ATTORNEYS

INVENTORS
LAWRENCE A. FERGUSON
ROBERT K. JONES
DONALD W. TATES

ATTORNEYS

INVENTORS
LAWRENCE A. FERGUSON
ROBERT K. JONES
DONALD W. TATES
BY
ATTORNEYS

XEROGRAPHIC REPRODUCING APPARATUS

This invention relates to xerographic reproducing machines, and, in particular, to an automatic xerographic reproducing machine adapted to reproduce original documents on a photoreceptive surface at a preselected optical reduction rate.

In the practice of xerography, as described in U.S. Pat. No. 2,297,691 to Chester F. Carlson, a xerographic surface comprising a layer of photoconductive insulating material affixed to a conductive backing is used to support electrostatic images. In the usual method of carrying out the process, the xerographic surface is electrostatically charged uniformly over its surface and then exposed to a light pattern of the image being reproduced to thereby discharge the charge in the areas where light strikes the layer. The undischarged areas of the layer thus form an electrostatic charge pattern in conformity with the configuration of the original light pattern.

The latent electrostatic image can then be developed by contacting it with a finely divided electrostatically attractable material such as a powder. The powder is held in image areas by the electrostatic charges on the layer. Where the charge field is greatest, the greatest amount of material is deposited; where the charge field is least, little or no material is deposited. Thus a powder image is produced in conformity with the light image of copy being reproduced. The powder is subsequently transferred to a sheet of paper or other surface and suitably affixed thereto to form a permanent print.

Most xerographic equipment in commercial use today is adapted to create copies of originals at about a 1:1 optical rate. That is to say, it reproduces the original is size as well as content.

The instant invention is directed to apparatus for reproducing original documents as either 1:1 optical rate or at any one of plurality of optical reductions while creating an undistorted reproduction of the original.

It is therefore an object of the instant invention to create xerographic copies of original documents.

Another object of this invention is to xerographically reproduce copies of originals at either the same size as the original or at any one of a plurality of optical reductions.

Still another object of the instant invention is to selectively vary the conjugate length of the optical system of a xerographic reproducing machine to yield optical reductions of original documents being copied.

A further object of the instant invention is to vary the optical scan rate of a stationary original document in accordance with the conjugate length of the optical system to create undistorted copies of the original at preselected optical reductions.

A further object of the instant invention is to vary the scan rate of a variable optical reduction projector through the use of a cam follower cooperable with multilobed cam, the employed cam lobe dictating the scan rate and consequently the optical reduction.

These and other objects of the instant invention are attained in accordance with the present invention by an automatic xerographic reproducing machine including an optical scanning system adapted to be selectively actuated for reproducing images at one of a plurality of preselected optical reductions.

Further objects of this invention, together with additional features and advantages thereof, will become apparent from the following description of one embodiment of the invention when read in conjunction with the accompanying drawings, wherein:

Figure 1:
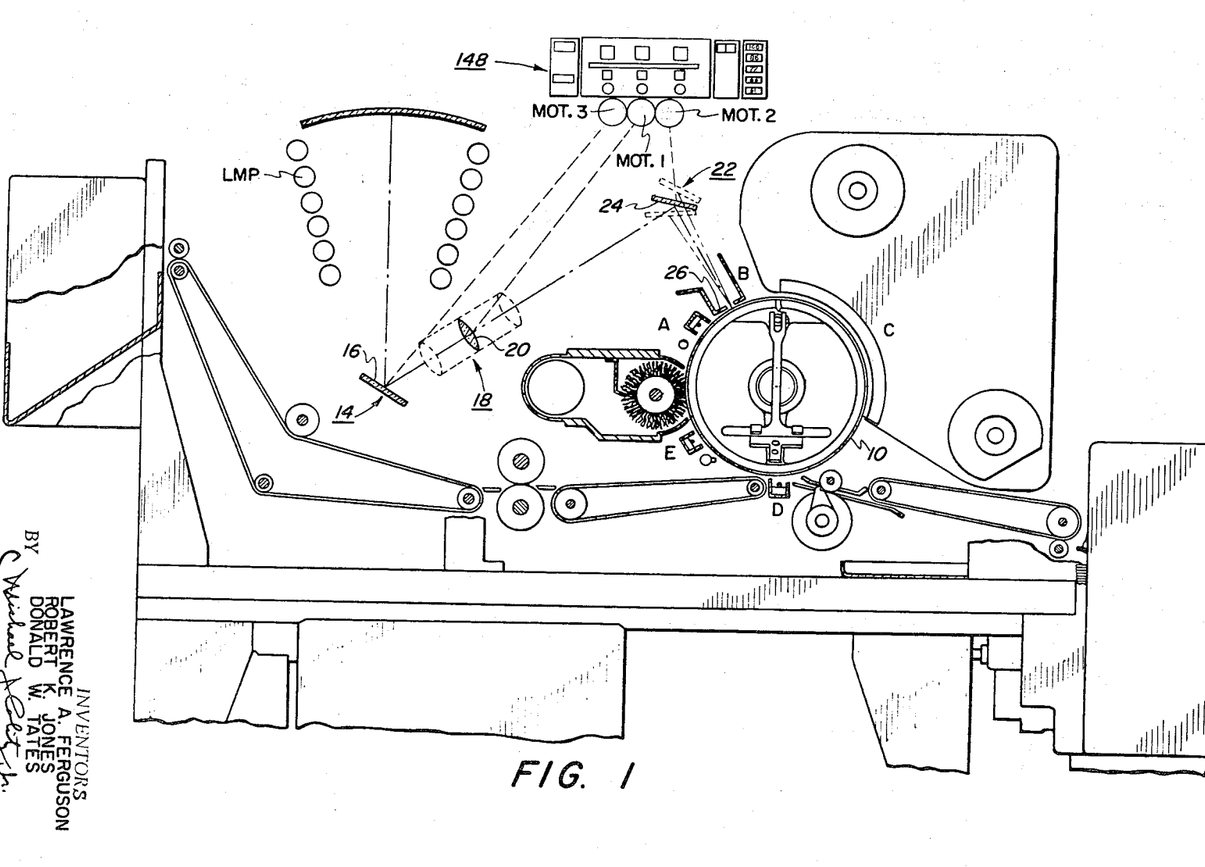
FIG. 1 is a schematic representation of an automatic xerographic reproducing machine utilizing the invention of the application.

Referring now to the drawings, there is shown in FIG. 1 an embodiment of the subject invention is a suitable environment such as an automatic xerographic reproducing machine. The automatic xerographic reproducing machine includes a xerographic plate or surface 10 formed in the shape of a drum. The plate has a photoconductive layer or light receiving surface on a conductive backing, journaled in a frame to rotate in the direction indicated by the arrow. The rotation will cause the plate surface to sequentially pass a series of xerographic processing stations. For the purposes of the present disclosure, the several xerographic processing stations in the path of movement of the plate surface may be described functionally, as follows:

A charging station A, at which a uniform electrostatic charge is deposited on the photoconductive plate;

An exposure station B, at which light or radiation pattern of copy to be reproduced is projected onto the plate surface to dissipate the charge in the exposed areas thereof to thereby form a latent electrostatic image of the copy to be reproduced;

A developing station C at which xerographic developing material, including toner particles having an electrostatic charge opposite to that of the latent electrostatic image, is cascaded over the plate surface whereby the toner particles adhere to the latent electrostatic image to form a toner-powder image in a configuration of the copy being reproduced;

A transfer station D at which the toner-powder image is electrostatically transferred from the plate surface to a transfer material or a support surface; and A drum cleaning and discharge station E at which the plate surface is brushed to remove residual toner particles remaining thereon after image transfer and exposed to a relatively bright light source to effect substantially complete discharge of any residual electrostatic charge remaining thereon.

It is felt that the preceding description of the xerographic process is sufficient for an understanding of the invention. Further details may be had by reference to U.S. Pat. No. 3,301,126 issued to Osborne et al.

Referring again to FIG. 1, a xerographic drum is rotated and an incremental area of a document on a platen 12 is scanned at a rate such that the optical image is stationary relative to the xerographic drum. The optical scanning or projection system disclosed herein projects a flowing image onto the surface of the photoconductive drum from a stationary original. The optical scanning or projection assembly comprises a stationary copy board which includes a transparent curved platen member 12, such as, for example, a glass plate or the like positioned on the exterior of the machine and adapted to support a document to be reproduced. The document is uniformly illuminated and arranged in light projection relation to the moving light-receiving surface of the xerographic drum. Uniform lighting is provided by banks or lamps LMPS arranged on opposite sides of the platen.

Scanning of the document on the stationary platen is accomplished by means of an object mirror assembly 14 which is oscillated relative to the platen in timed relation to the movement of the xerographic drum. The mirror assembly, which includes an object mirror 16, is mounted below the copy holder to reflect an image of the document past a lens assembly 18 including a lens 20, to an image mirror assembly 22 including an image mirror 24 which, in turn, reflects the image onto the xerographic drum through a slot in the fixed light shield 26 positioned adjacent to the xerographic drum surface. In the embodiment of the invention shown, the scanning of images such as original documents is accomplished by placing the original copy on the copy holder 12 and scanning the document by means of oscillating the object mirror 16, through a lens 20 onto an image mirror 24 which, in turn, reflects the image through a slotted light shield 26 onto the xerographic drum 10.

Figure 2:
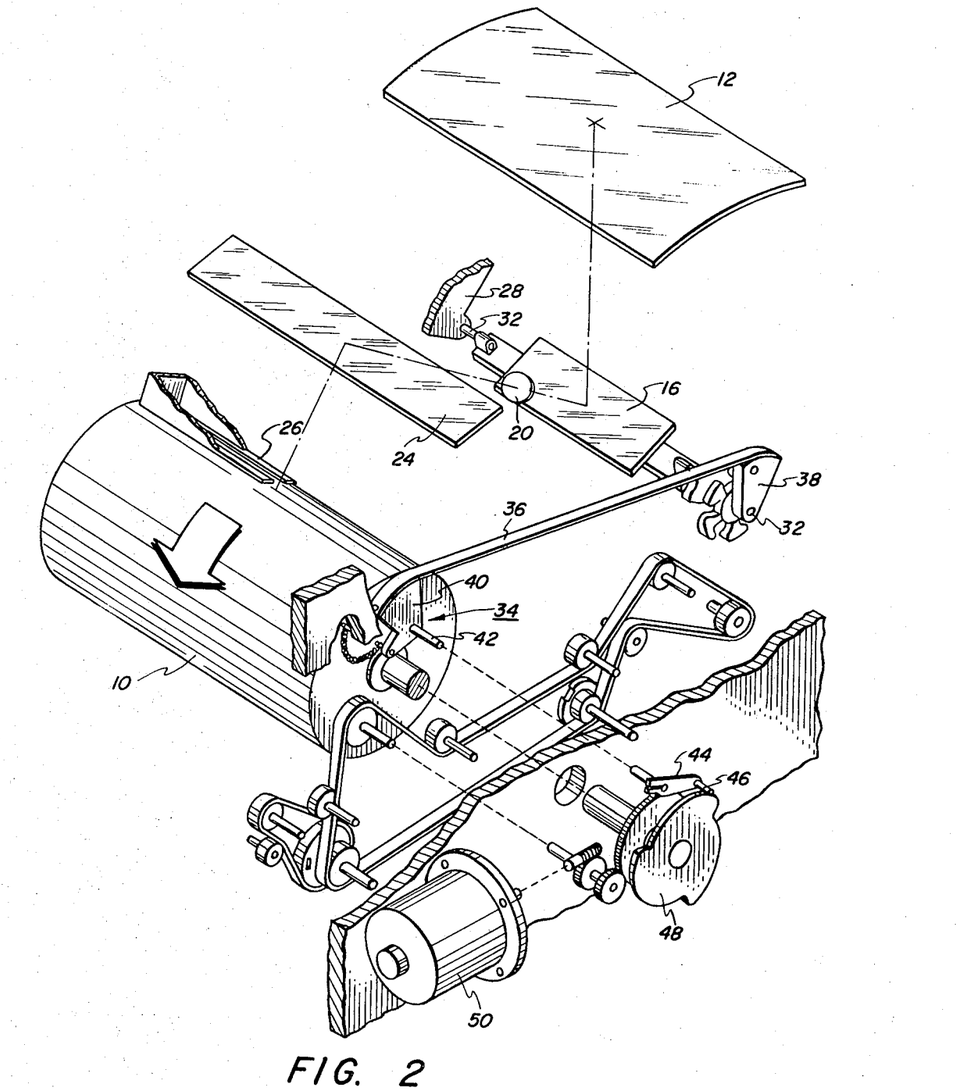
FIG. 2 is a perspective view of the optical system of the invention and the drive system for the various cooperative elements associated with the xerographic drum.

The exposure mechanism includes an optical frame 28 for supporting the object mirror, lens and image mirror. The optical frame 28 is supported between the machine frames, one of which, 30, is partially shown in FIG. 2.

The platen 12, made of transparent material such as glass, is suitably supported by the lamp holder frame assembly directly over the axis of rotation of the object mirror 16. Platen 12 is curved in the shape of an arc, with the radius thereof equal to the distance from the platen surface to the axis of rotation of the object mirror 16.

The original document to be reproduced is placed on the curved platen 12. Uniform illumination is achieved by banks of lights such as fluorescent lamps LMPS mounted in conventional fluorescent lamp holder secured to a suitable lamp holder frame assembly.

Object mirror 16 is supported by a suitable mirror support assembly fixed to a mirror shaft 32 journaled by suitable bearings mounted in optical frame 28. It is noted that this assembly positions the object mirror in a flattened portion of the shaft 32 so that the reflecting surface of the mirror is in a plane extending through the axis of shaft 32. Oscillating of shaft 32 and therefore the scanning or object mirror 16 is governed by a controller hereinafter described in detail. Motion in one direction, during scanning, is generally effected by means of drive system 34 comprising a steel tape 36 secured at one end to a portion of the controlled segment 38 and at the other end to controller segment 40 which is driven in synchronization with the rotation of the xerographic drum. Motion is imparted to controller segment 40 through shaft 42, follower arm 44, cam follower 46, driven cam 48 and motor 50. The mirror is then returned to its start of scan position by means of a spring 52 connected at one end to a pin 54 fixed to the controller and at its other end to a pin 56 secured in the optical frame 28 to normally bias the mirror into the start of scan position. These elements are the same as disclosed in the aforementioned Osborne et al. patent so further descriptions herein are not deemed necessary. The differences between the object mirror scanning elements of the instant system and that of Osborne et al. reside between the controlled segment 38 and shaft 32, a detailed description of which appears hereinafter.

As shown in FIGS. 1, 3, 4, and 5, lens 20 is mounted between the object mirror 16 and image mirror 24 in an image projecting relationship therewith. The lens is mounted in a shiftable lens block or carriage 58 for movement along the optical axis of the imaging system. The carriage 58 includes a pair of apertures 60 to effect sliding movement of the carriage on fixed guide rods 62. The guide rods 62 are held fixed with respect to the machine frame by means of bolts 64 at opposite ends of the guide rods which fixedly mount the rods on machine frame extensions 66.

Figure 3:
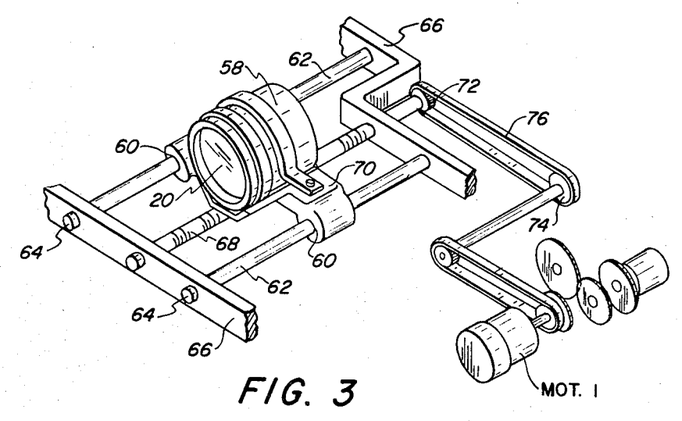
FIG. 3 is a perspective view of the lens and lens moving elements.
Figure 4:
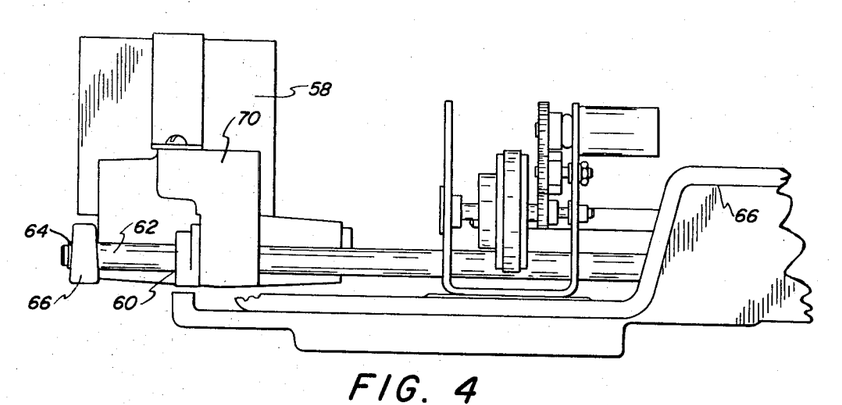
FIG. 4 is a side view of the lens and lens moving elements.
Figure 5:
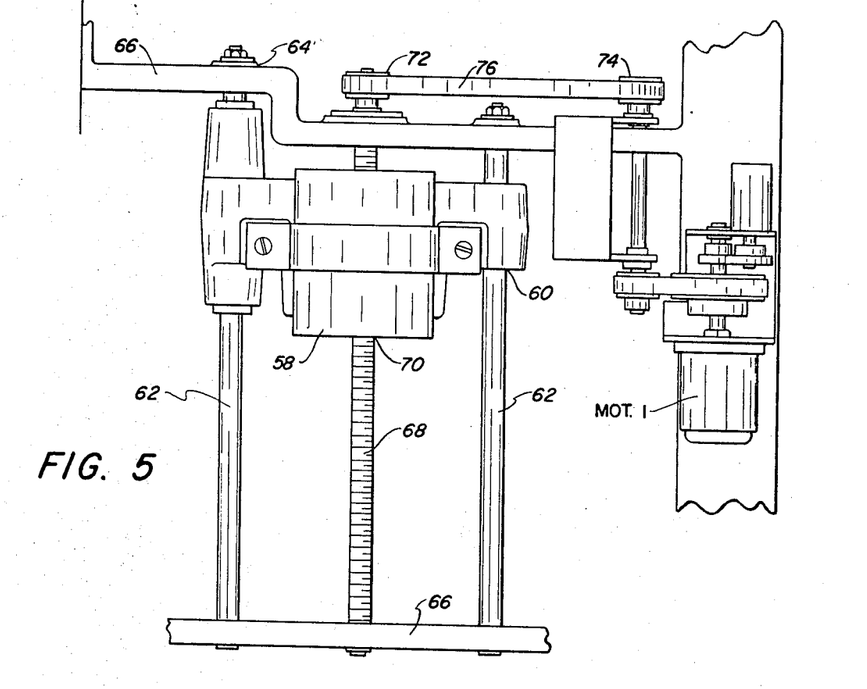
FIG. 5 is a top plan view of the elements shown in FIG. 3.

Rotatably mounted at opposite ends in the machine frame extensions 66 is a rotatable lens carriage jack screw 68 having a threaded surface in mating engagement with threaded aperture 70 in lens carriage 58. Rotation is imparted to the jack screw through driven pulley 72 and drive pulley 74 which are interconnected through drive belt 76. Rotation of the pulleys is achieved through motor assembly MOT-1 which is rotatable in either direction to rotate the jack screw 68 to move the lens carriage 58 and lens 20 in either direction along the optical axis of the system. This movement of the lens is necessary for the optical reductions of the system.

The optical system of the disclosed embodiment of this invention is constructed for imaging documents at any one of five optical reductions. FIG. 1 shows the lens, in its solid line position, for imaging at an intermediate optical reduction. The dotted line positions illustrate extreme alternate position for the lens for creating other optical reductions.

In order to receive optical reductions through a single lens, it is further necessary to vary the conjugate length of the optical system. This is achieved in the disclosed embodiment through the movement of image mirror 24. Image mirror assembly 22, as shown in FIGS. 1, 6, 7 and 8 includes the image mirror 24 and mounting elements required to effect its proper movement. FIG. 1 illustrates, in the solid line position, the image mirror oriented effect and intermediate optical reduction. The two dotted line showings of the image mirror disclose it at position or effecting extreme optical reductions. Note is taken that the image mirror 24 moves along the optical axis to vary the conjugate length of the system. Movement of the image mirror is also accompanied by a variation in its angle of repose with respect to the vertical to assure projection of the flowing image onto the drum at the slit in the light shield. Note the dotted line showings of the varying optical axes in FIG. 1.

Figure 6:
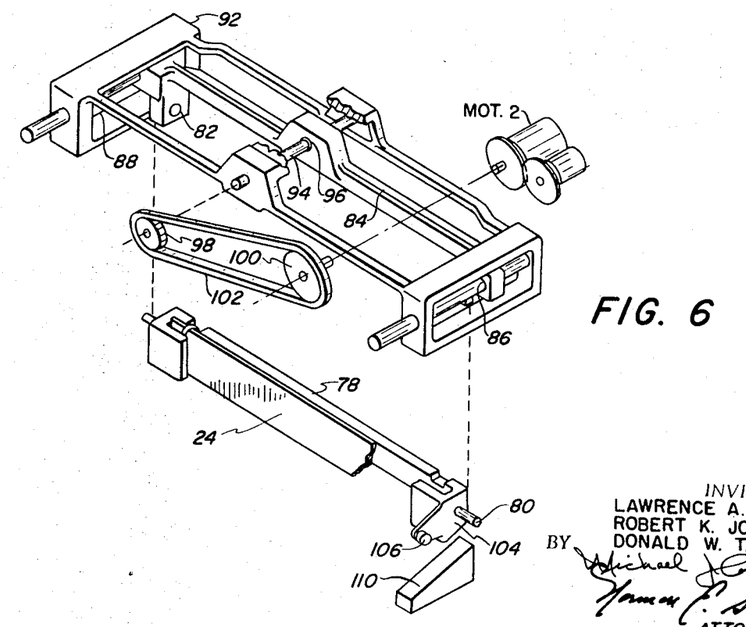
FIG. 6 is a perspective view of the image mirror and image mirror moving elements.
Figure 7:
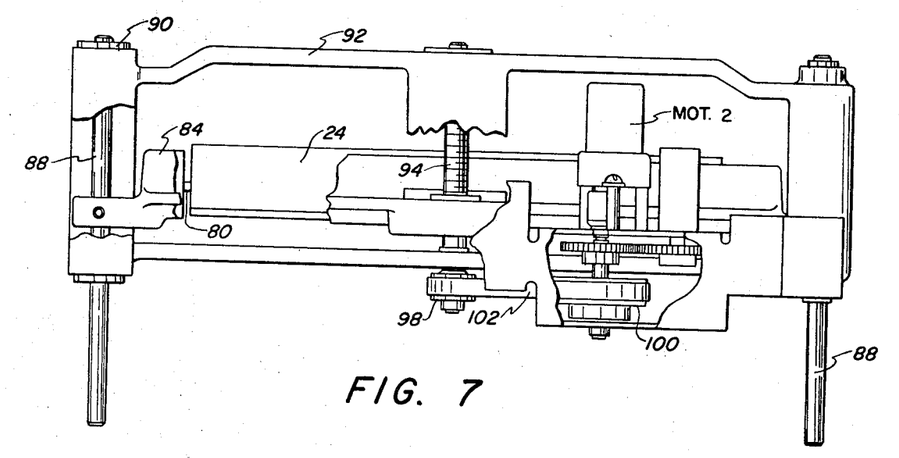
FIG. 7 is a top view of the image mirror and image mirror moving elements.
Figures 8, 9:
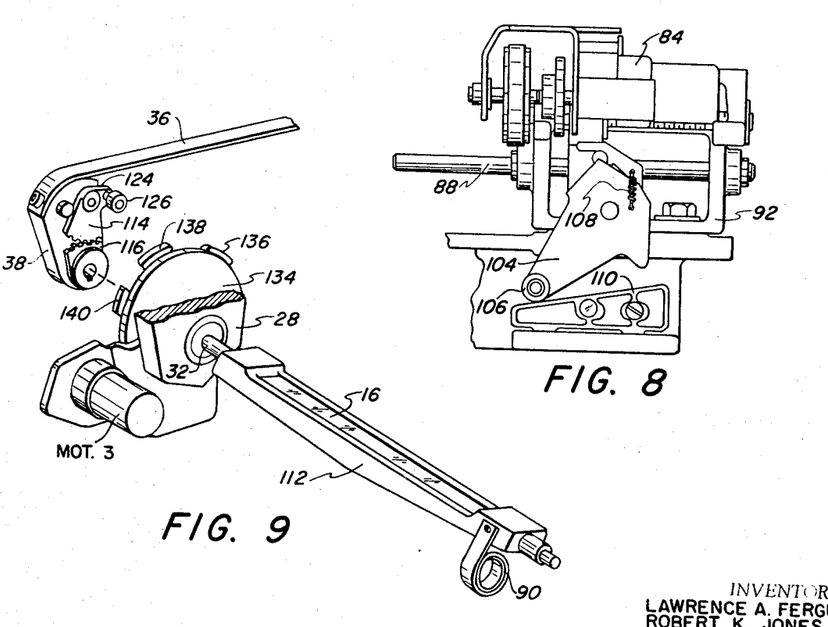
FIG. 8 is a side view of the elements shown in FIG. 6 with parts broken away for clarity.
FIG. 9 is a perspective view of the object mirror and motion imparting elements.

Image mirror 24 is mounted on a rotatable image mirror support carriage 78 having externally projecting cylindrical shafts 80. Shafts 80, on each side of the carriage 78, extend into bearing apertures 82 formed in an image mirror slide block or carriage 84 for rotation of the image mirror relative to the slide carriage. Image mirror slide carriage 84 includes a pair of apertures 86 to permit the sliding motion of the slide carriage with image mirror guide rods 88 to which they are fixed. In a manner similar to the mounting of lens carriage 58, the image guide rods 88 are slidable with respect to the machine frame since opposite ends of the guide rods 88 are slidably received within bearing apertures 89 in the machine frame extensions 92.

Rotatably mounted on opposite ends of machine frame extensions 92 is a rotatable image mirror jack screw 94 having a threaded surface in mating engagement with a threaded aperture 96 in the image mirror slide carriage 84. Rotating is imparted to the jack screw 94 through driven pulley 98 and drive pulley 100 which are interconnected through drive belt 102. Rotating of the pulleys is achieved through motor MOT-2, which is rotatable in either direction to rotate the jack screw 94 to move the image mirror slide carriage 84 and image mirror 24 in either direction to vary the conjugate length of the optical system.

As can be seen, linear motion of the image mirror slide carriage 84 is achieved by the rotation of MOT-2 in either direction. The required canting of the image mirror is achieved through follower rod 104 formed integral with one end of the support carriage 78. Follower rod 104 is constructed with a rotatable cam follower 106 which is urged by spring 108 into riding contact with a fixed cam surface 110. Thus, as the image mirror slide carriage 84 longitudinally shifts the image mirror support carriage 78 and image mirror 24 to vary the conjugate distance of the optical system, cam follower 106 acts to vary the angular orientation of the image mirror to assure the directing of the flowing projected image through the aperture of the light shield 26 and onto the photoconductive surface 10.

By way of example, the illustrated embodiment of the instant invention is constructed for creating copies at a 100 percent (1:1), 85 percent, 77 percent, and 66 percent and 61½ percent optical reduction. The solid line showing of the lens 20 and the image mirror 24 illustrate the optical system arranged to reproduce at 77 percent of the size of the original document on the platen 12. This is an intermediate orientation of these optical elements. When 100 percent magnification is desired, the lens is moved a predetermined distance toward the object mirror 16 and the image mirror is moved slightly toward the object mirror 16 and canted slightly towards the horizontal. If the greatest optical reduction, 61½ percent is desired, the lens is moved another predetermined distance away from the object mirror 16 and the image mirror is moved away from the object mirror 16 and canted slightly toward the vertical. It should be understood that the above noted optical reduction could be negative reductions for creating enlarged reproductions of original documents.

The varying of the location of the lens and image mirror in the optical system acts to vary the image along the axial length of the drum. Thus, if the optical system were modified as described above with no variation in the rate of scan by the oscillating object mirror 16 or no variation in the rate of rotation of the drum, latent electrostatic images on the drum and resultant copy therefrom would be distorted. Such distortion would be characterized by varied optical reductions along the axial length of the drum but 100 percent reproduction circumferentially on the drum due to the fact that the scan rate and rate of rotation of the surface of the xerographic drum were constant. By way of example, if 100 percent size reproduction of a document were desired, the object mirror would have to scan the document at the same linear speed as the surface speed of the xerographic drum. If a 50 percent reduction in the image of the copy of the original document were desired, the scan rate of the original would have to be twice the original rate of scan or twice the linear speed of the surface of the xerographic drum. Therefore, since the xerographic drum is constructed to rotate at a constant surface speed, the scanning rate of the object mirror must be selectively variable with respect to the optical reduction rate desired in order to achieve the projection of an image optically reduced in both the length and width of the image, viz., axially and longitudinally with respect to the drum.

Object mirror 16 is shown in FIGS. 1, 9, 10 and 11. It is supported on an object mirror mounting bracket 112 by springs 113 which is fixed relative to rotatable object mirror shaft 32 for movement of the object mirror by shaft 32 in the manner described in the aforementioned Osborne et al. patent. Mounting of the object mirror 16, mounting bracket 112, and shaft 32 are correlated so that the reflective fact of the object mirror 16 lies on the axis of rotation of shaft 32. Motion is imparted to the oscillating object mirror 16 from motor 50 through controller segment 40, tape 36 and the follower or controlled segment 38 in the same manner as described in the aforementioned Osborne et al. patent. In the Osborne et al. patent, however, the follower or controlled segment is fixedly keyed to the object mirror shaft for direct oscillation of the object mirror from the oscillation of that segment. According to the instant invention, the controlled segment 38 is rotatably journaled on the object mirror shaft 32 for rotation relative thereto. In this manner, a unitary oscillation of the controller and controlled segments 38 and 40 may be employed to impart one of a plurality of preselected scan rates to the object mirror shaft 32 and consequently to the object mirror 16.

Figures 10, 11:
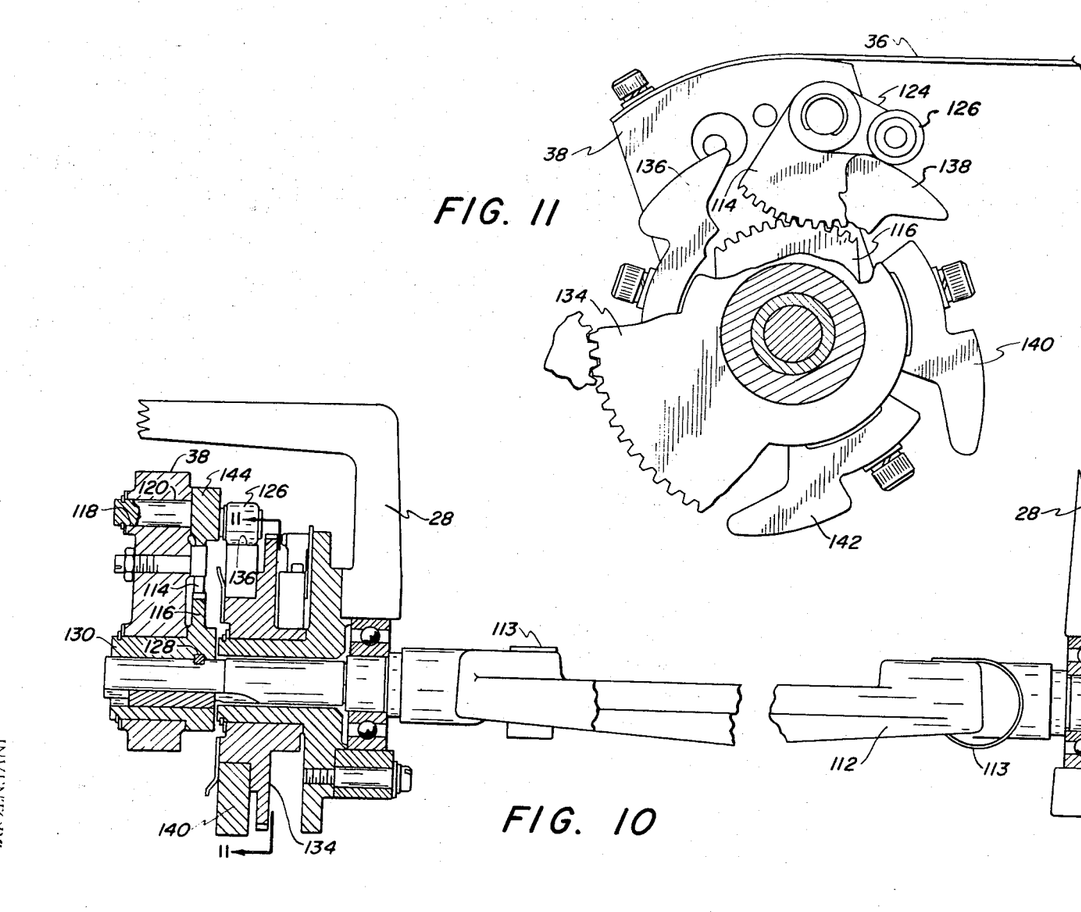
FIG. 10 is a top l plan view of part of the object mirror and motion imparting elements.
FIG. 11 is a sectional view of the motion imparting elements taken along line 11-11 of FIG. 10.

Motion of the controlled segment 38 is translated into motion of the object mirror shaft 32 through a driven gear segment 114 and driven gear segment 116 located with their axes of rotation at a fixed distance from each other and with their respective toothed portions in mating contact. Both of the gear segments are arranged with their main portion in planes of rotation parallel to the plane of rotation of the controlled segment 38. The driver gear segment 114 is formed with a cylindrical projecting arm 118 mounted in an aperture 120 in controlled segment 38. A suitable bearing assembly may support the arm 118 and driver segment 114 for rotation with respect to the controlled segment 38. Controlled segment 38 also has an outstanding arm 124 provided with a wheel-type cam follower 126 projecting at about a right angle with respect to its toothed portion.

Driven gear segment 116 is formed with an apertured base portion secured to the object mirror shaft 32 through key 128. A neck area 130 of the driven gear segment 116 has a cylindrical external surface upon which the controlled segment 38 is rotatably supported as through a suitable bearing assembly. The toothed portion of the driven gear segment is in mating engagement with the toothed portion of the driver gear segment 114 with its teeth located in an arc concentric with the axis of rotation of the object mirror shaft 32. The teeth of the driver gear segment are located in an arc concentric with the axis of rotation of the rotatable projecting arm 118.

Also located in the object mirror assembly 14 is a rotatable cam base 134. This cam base 134 includes a plurality of lobes 136, 138, 140, 142 and 144, in a number corresponding to the number of optical reductions of which the machine is capable. The number of lobes thus correspond to the number of positions of the optical systems. Each lobe is provided with a different surface cam slope designed to impart a proper motion to the driver and driven gear segments 114 and 116 to effect a desired scan rate of the object mirror. The cam base 134 is rotatable as on a suitable bearing assembly by motor MOT-3 to bring a preselected one of the lobes beneath cam follower 126. Once positioned, however, the cam base 134 and consequently the preselected lobe, 136 for example, remain fixed during the oscillation of the controlled segment 38 and object mirror 16. Oscillation of the controller segment 40 in the manner described in the aforementioned Osborne et al. patent will oscillate the controlled segment 38 at a single or non-variable rate. This in turn will impart an oscillation to the axis of projecting arm 118 which will be a fixed rate regardless of the orientation of cam base 134 and the magnification reduction desired. The clockwise motion of the projecting arm 118 as shown in FIG. 8 will cause the entire driver gear segment 114 to pivot about the axis of projecting arm 118 causing its toothed section to rotate the driven gear segment 116 at a rate determined by the rate of rise of cam follower 126 moving up the prepositioned lobe 136 for example. Spring member 90 acts to resiliently urge the shaft 32 and the driver and driven segments 114 and 116 to the start of scan position. This will consequently urge cam follower 126 into continual contact with the cam lobe 126 during scanning. Since any of the 5 lobes can be selectively moved into operative relation with cam follower 126, and since each lobe has a different slope corresponding to the conjugate length and position of the lens and image mirror, the rate of rotation of the driven gear segment 116 and rate of scan of object mirror 116 can be regulated to correspond with the optical reduction desired.

The lobe segments are designed so that the points thereon representing their points of contact with the cam follower at any start of scan position are equidistant from the axis of rotation of shaft 32. In this manner the object scanning mirror has the same start of scan orientation for any lobe segment employed or any scan rate desired.

Shown in FIG. 1 is a machine console 148 substantially the same as that disclosed in the aforementioned Osborne et al. patent, the functioning buttons and indicator lights operating in the same fashion as disclosed therein. In addition thereto, there is also provided a plurality of optical reduction selector buttons generally indicated as 150. If, for example, the machine is put in operation by depressing the "POWER ON" button and "START PRINT", the light behind the optical reduction selector button would be illuminated to indicate the last used optical reduction state of the machine. The machine would then be conditioned to create copies at that preselected optical reduction rate. If, however, a different rate were desired, the button indicating the new rate would be depressed by the operator. If desired, the controls could be programed to return the machine to the 100 percent (1:1) imaging rate each time a run of reduced size images were made.

The depression of a new optical reduction rate button acts to initiate the programed operation of MOT-1, MOT-2, and MOT-3, respectively. The programed indexing and stopping of the motors and their associated mechanisms may be accomplished by conventional programing techniques, as for example, those disclosed for indexing and stopping the motors and mechanisms in the machine described in U.S. Pat. No. 3,355,236 to G.P. Taille et al. The programed operation of MOT-1 will move the lens carriage 58 and lens 20 along the optical axis of the system to a location corresponding to the selected optical reduction rate. The programed operation of MOT-2 will also move the image mirror slide carriage 84 in a longitudinal path to its proper orientation with cam follower 106 riding on cam surface 110 to produce the proper angle of image mirror 24 to allow the projecting of the image onto the xerographic drum. In like fashion, MOT-3 is actuated in a programed fashion to bring the appropriate lobe on cam base 134 beneath cam follower 126 so that the rate of scan of the image by object mirror 16 can be correlated to the orientation of lens 20 and image mirror 24. The correlation of these elements, including the rate of scan, produces preselected optical reduction rates with no distortion in the copy.

As will be understood, the optical reduction rates shown herein are by way of example only. The lobe sections 136, 138, etc., may be made removable from cam base 134 so that other optical reduction rates may be achieved as desired. Cam base 134 may also be designed to accommodate any number of lobes of varying slope. In association therewith, the motors MOT-1, MOT-2, and MOT-3 would be programed to correspond to the predesigned slope of the lobes.

While the present invention, as to its objects and advantages, has been described as carried out in a specific embodiment thereof, it is not desired to be limited thereby; but it is is intended to cover the invention broadly within the scope of the appended claims.

We claim:

1. Apparatus for scanning a document to be reproduced and for projecting images of the document onto a photoreceptive surface including;
   support means for maintaining the document to be reproduced in a stationary position;
   first drive means to move the photoreceptive surface at a fixed rate across an optical path emanating from the document to be reproduced and terminating at the photoreceptive surface surface;
   a scanning mirror positioned to sweep an optical image of the document positioned on said support means across said photoreceptive surface to form a latent electrostatic image of the document on said photoreceptive surface;
   a lens interposed in said optical path to project images of the document to said photoreceptive surface;
   an image mirror in the optical path to reflect light images of the document to be reproduced from said lens to said photoreceptive surface;
   magnification varying means to move the lens and image mirror to a preselected one of a plurality of positions to project the image of the document to be reproduced to the photoreceptive member at a preselected optical reduction rate; and
   second drive means to oscillate the scanning mirror at a rate correlated to the location of the lens and image mirror such that an undistorted image of the document is projected onto said photoreceptive surface.

2. The apparatus as set forth in claim 1 wherein the movement of the image mirror varies the length of the optical path and further including means to vary the angular disposition of the image mirror in accordance with the length of the optical path so that the projected image will strike the photoreceptive surface at the same relative position.

3. The apparatus as set forth in claim 1 and further including means including a tape interconnecting said first drive means and said second drive means for moving said second drive means from said first drive means.

4. Apparatus for scanning a document to be reproduced and for projecting images of the document onto a light responsive member including;
   support means for maintaining the document to be reproduced in a stationary position;
   first drive means to move the light responsive member at a fixed rate across an optical path emanating from the document to be reproduced and terminating at the light responsive member;
   a scanning mirror positioned to sweep an optical image of the document positioned on said support means across said light responsive member to form a latent image of the document on said light responsive member;
   a lens interposed in said optical path to project images of the document to said light responsive member;
   an image mirror in the optical path to reflect light images of the document to be reproduced from said lens to said light responsive member;
   magnification varying means to move the lens and image mirror to a preselected one of a plurality of positions to project the image of the document to be reproduced to the light responsive member at a preselected optical reduction rate;
   second drive means to oscillate the scanning mirror at a rate correlated to the location of the lens and image mirror such that an undistorted image of the document is projected onto said light responsive member; and
   means including a tape interconnecting said first drive means and said second drive means for moving said second drive means from said first drive means, said last mentioned means including a mechanism for converting the constant velocity, constant throw movement of said tape into one of a plurality of rotational velocities of said object scanning mirrors from a single predetermined start of scan position.

5. Apparatus for scanning a document to be reproduced and for projecting light images of the document onto a light responsive surface including:
   support means for maintaining the document in a fixed position during scanning;
   first drive means to move the light responsive surface at a fixed rate across an optical path emanating from the document and terminating at the light responsive surface;
   a lens interposed in said optical path to project light images from the document to said light responsive surface;
   an object mirror in the optical path to reflect light images from the document toward said lens;
   an image mirror in the optical path to reflect light images from said lens toward said light responsive surface;
   scanning means to sweep an optical image of the document to said object mirror, to said lens, to said image mirror to said light responsive surface;
   magnification varying means to move said lens and image mirror along said optical path to a preselected one of a plurality of positions while maintaining the distance between the object mirror and support means fixed to thereby project the image of the document to the light responsive member at a preselected optical reduction rate; and
   second drive means to move the scanning means at a speed correlated to the location of said lens and image mirror so that an undistorted image of the document is projected to said light responsive surface.